F. W. KING.
SPECTACLES.
APPLICATION FILED JUNE 30, 1914.
1,204,161.
Patented Nov. 7, 1916.
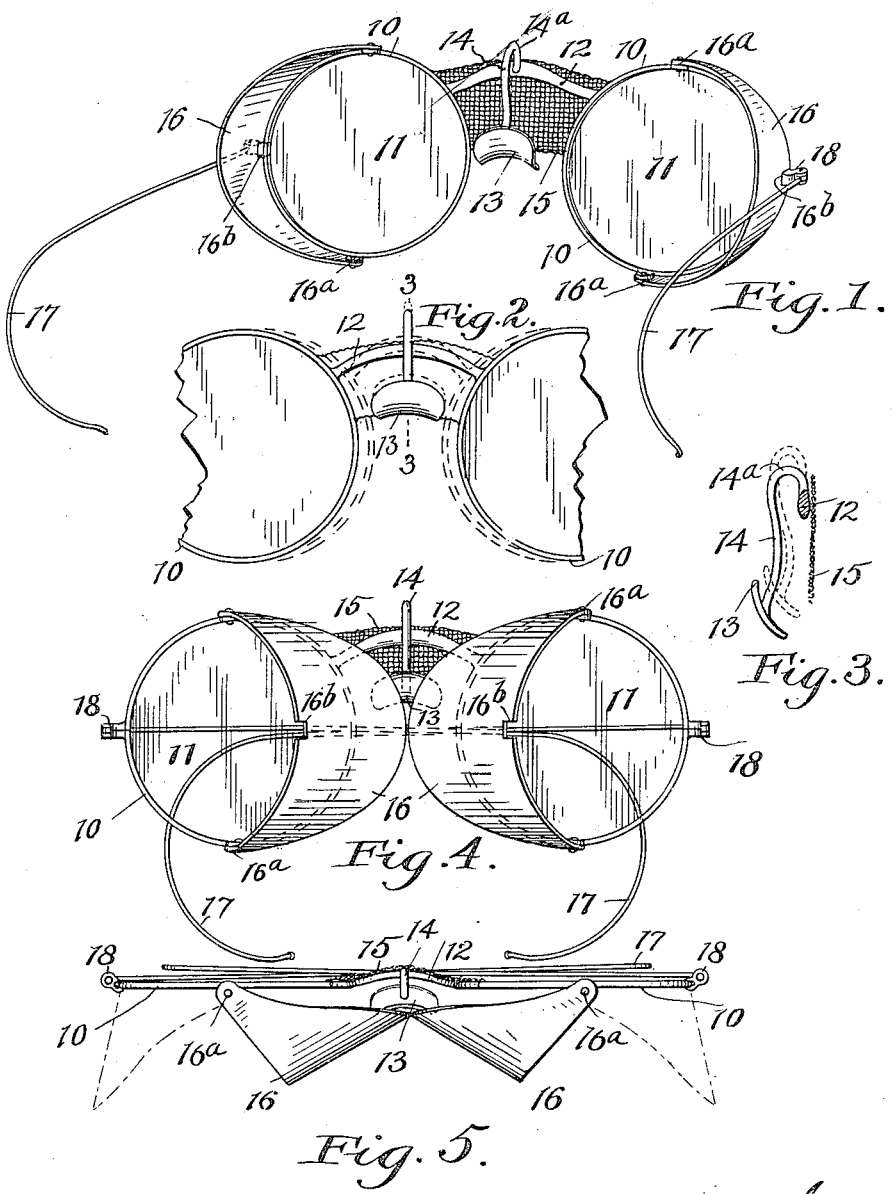

UNITED STATES PATENT OFFICE.

FREDERICK W. KING, OF CLEVELAND, OHIO.

SPECTACLES.

1,204,161.  Specification of Letters Patent.  Patented Nov. 7, 1916.

Application filed June 30, 1914. Serial No. 848,303.

*To all whom it may concern:*

Be it known that I, FREDERICK W. KING, a citizen of the United States, residing at Cleveland, in the county of Cuyahoga and State of Ohio, have invented a certain new and useful Improvement in Spectacles, of which the following is a full, clear, and exact description.

This invention relates to spectacles or goggles, and has for its object to provide improved means for protecting the eyes of the wearer against foreign particles, and which enable the spectacles to be adjusted to the wearer more effectively than with the spectacles heretofore provided.

My invention may be briefly summarized as consisting in certain novel details of construction and combinations and arrangements of parts which will be described in the specification and set forth in the appended claims.

In the accompanying sheet of drawings wherein I have shown one embodiment of my invention, Figure 1 is a perspective view of my improved spectacles, Fig. 2 is a rear view of a portion of the same showing by dotted lines the manner in which the eye-wires may be spread or moved inward toward each other to adjust the width of the space between the same, Fig. 3 is a sectional view through the cross bar or bridge and nose piece substantially along the line 3—3 of Fig. 2, showing by dotted lines the manner in which the position of the nose piece may be adjusted, Fig. 4 is a rear view of the spectacles with the parts folded for insertion in a case, and Fig. 5 is the top view of the same.

Referring now to the drawings, 10 represents the two eye-wires holding the lenses 11. These eye-wires are connected by a bridge, in this instance consisting of a single bar 12, which is rigidly secured at its ends to the eye-wires and from which is supported a nose piece 13, which is connected to the bar by a post 14, the said post having a loop 14ª, which in this form of my invention extends upwardly above the bar and thence downwardly to the same.

In accordance with one of the important features of my invention, both the bar 12 and post 14 are made of flexible material which admit of the bending of the bar to adjust the space between the eye-wires and the adjustment of the nose piece by bending the post, and particularly that part forming a loop 14ª. This enables the eye-wires to be brought inward toward each other, or to be spread so that they will be the right distance apart for the nose of the wearer, and the adjustment of the nose piece, which can be raised or lowered or moved forwardly and rearwardly admits of the supporting of the spectacles on the nose in such a way that the lenses will be in just the position to suit the eyes of the wearer. It is not essential that I employ a single bar 12 or a bar of the shape shown herein, nor is it essential that the post 14 supporting the nose piece be connected to the bar 12 in just the manner shown, as this post may assume any other desired shape and may be connected to the bar in any suitable manner.

Extending between the eye-wires, and preferably attached thereto and to the bar, if desired, is a shield or protector 15 which protects the eyes from foreign bodies entering the eye from the front and at an angle over the nose, *i. e.*, from entering in a diagonal direction between the eye-wires. This shield is preferably a fine wire mesh or woven wire cloth, which will afford the necessary protection against the entrance of flying particles. The screen which is flexible, and therefore does not in the least interfere with the adjustment of the space between the eye-wires by bending the bar 12, may be soldered at its ends to the eye-wires.

It is not essential that the shield 15 be in the form of a screen, although the latter is preferable, but it may be in the form of a plate, perforated or unperforated. If the plate lacks flexibility, to avoid interfering with the bending of the bar 12, it will be attached at its upper corners only to the two eye-wires so as not to interfere with the adjustment of the space between the eye-wires.

The outer parts of the eye-wires are preferably provided also with shields 16, which are pivoted at the upper and lower diametrical points 16ª on the eye-wires, so that when in operative position they will be located as shown in Fig. 1, and may be folded inwardly against the nose piece 13, as shown in Fig. 5.

The spectacles are provided with temples 17, pivoted to end pieces 18 secured to the eye-wires. The end pieces 18 are reversed from the regular ordinary positions so that the temples may be folded forwardly alongside the front of the lenses. They could not be folded inwardly along the rear of the lenses because of the shields 16. This permits all parts of the spectacles including the protectors to be folded with sufficient compactness to admit of the same being placed in a spectacle case. The shields 16 are provided with notches 16ᵇ, which receive the end pieces 18 when said protectors are swung outwardly to normal operative position.

Having thus described my invention, I claim:—

1. In a spectacle construction, a pair of eye-wires, a flexible bridge rigidly secured at its ends to the eye-wires and spacing the same, and a flexible shield extending across the space between the eye-wires and having its ends joined to the respective eye-wires.

2. In a spectacle construction, a pair of spaced lenses and metallic rims therefor, a flexible bridge member connecting the rims and rigidly secured thereto, whereby the distance between the lenses may be adjusted by flexing the bridge member, a nose piece disposed below the bridge member, and a flexible post directly connecting the nose piece to the bridge member and including a loop extending above the bridge member, the lenses being so spaced as to permit the nose piece to be located between them.

In testimony whereof, I hereunto affix my signature in the presence of two witnesses.

FREDERICK W. KING.

Witnesses:
A. F. KWIS,
L. I. PORTER.

Copies of this patent may be obtained for five cents each, by addressing the "Commissioner of Patents, Washington, D. C."